United States Patent
Klar et al.

(10) Patent No.: US 8,319,681 B2
(45) Date of Patent: Nov. 27, 2012

(54) RADAR SENSOR HAVING A SHIELDED SIGNAL STABILIZER

(75) Inventors: Michael Klar, Magstadt (DE); Thomas Binzer, Stuttgart (DE); Klaus-Dieter Miosga, Backnang (DE); Oliver Brueggemann, Oelbronn-Duerrn (DE); Joachim Hauk, Renningen-Malmsheim (DE); Elisabeth Hauk, legal representative, Renningen-Malmsheim (DE); Rahel Hauk, legal representative, Renningen-Malmsheim (DE); Manuel Hauk, legal representative, Renningen-Malmsheim (DE); Dirk Steinbuch, Wimsheim (DE); Juergen Seiz, Welzheim (DE)

(73) Assignee: Robert Bosch GmbH, Stuttgart (DE)

( * ) Notice: Subject to any disclaimer, the term of this patent is extended or adjusted under 35 U.S.C. 154(b) by 448 days.

(21) Appl. No.: 12/561,735

(22) Filed: Sep. 17, 2009

(65) Prior Publication Data

US 2010/0103027 A1 Apr. 29, 2010

(30) Foreign Application Priority Data

Sep. 29, 2008 (DE) .......... 10 2008 042 449

(51) Int. Cl.
G01S 13/00 (2006.01)
(52) U.S. Cl. .................. 342/175; 342/70
(58) Field of Classification Search .......... 342/70–72; 438/121; 257/659
See application file for complete search history.

(56) References Cited

U.S. PATENT DOCUMENTS

| | | | |
|---|---|---|---|
| 6,096,981 A * | 8/2000 | Vinciarelli et al. | 174/263 |
| 6,159,772 A * | 12/2000 | Vinciarelli et al. | 438/115 |
| 6,181,573 B1 * | 1/2001 | Riet | 361/816 |
| 6,420,778 B1 | 7/2002 | Sinyansky | |
| 6,590,484 B2 * | 7/2003 | Garcia et al. | 336/65 |
| 6,686,867 B1 * | 2/2004 | Lissel et al. | 342/70 |
| 6,949,992 B2 | 9/2005 | Sweeney et al. | |
| 6,980,439 B2 * | 12/2005 | Schultz et al. | 361/753 |
| 7,092,639 B2 * | 8/2006 | Schultz et al. | 398/163 |
| 7,109,922 B2 * | 9/2006 | Shmuel | 343/700 MS |
| 7,154,432 B2 * | 12/2006 | Nagasaku et al. | 342/27 |
| 7,154,441 B2 * | 12/2006 | Hansen et al. | 343/700 MS |
| 7,215,558 B2 * | 5/2007 | Schultz et al. | 361/816 |
| 2004/0080917 A1 * | 4/2004 | Steddom et al. | 361/748 |
| 2005/0156780 A1 * | 7/2005 | Bonthron et al. | 342/107 |
| 2006/0132350 A1 | 6/2006 | Boltovets et al. | |
| 2009/0302436 A1 * | 12/2009 | Kim et al. | 257/659 |

FOREIGN PATENT DOCUMENTS

| | | |
|---|---|---|
| DE | 3426565 | 1/1986 |
| EP | 1363351 | 11/2003 |
| EP | 1793489 | 6/2007 |

OTHER PUBLICATIONS

Camiade M et al: "Fully MMIC—Based Front End for FMCW Automotive Radar at 77HJz" European Microwave Conference, 2000. 30th, IEEE, Piscataway, NJ, USA Oct. 1, 2000, pp. 1-4, XP031067362.

* cited by examiner

Primary Examiner — John B Sotomayor
Assistant Examiner — Matthew M Barker
(74) Attorney, Agent, or Firm — Kenyon & Kenyon LLP

(57) ABSTRACT

A radar sensor having a transmission module and a signal stabilizer, which are situated on a shared circuit board, a casing, which accommodates the signal stabilizer and forms a shield against high frequency radiation of the signal stabilizer together with a conductive layer of the circuit board, and having a connection line, which crosses through the shield, to connect the signal stabilizer to the transmission module, in which the connection line is embedded in the circuit board in insulated fashion.

2 Claims, 2 Drawing Sheets

RADAR SENSOR HAVING A SHIELDED SIGNAL STABILIZER

FIELD OF THE INVENTION

The present invention relates to a radar sensor having a transmitter module and a signal stabilizer, which are situated on a shared circuit board; a casing, which accommodates the signal stabilizer and together with a conductive layer of the circuit board forms a shield against high-frequency radiation of the signal stabilizer; and a connection line, which extends through the shield, to connect the signal stabilizer with the transmission module.

BACKGROUND INFORMATION

Radar sensors are used as distance sensors in motor vehicles, for example, and typically operate at a frequency of 77 GHz. For some time now, so-called MMICs (microwave monolithic integrated circuit) are used as transmission modules to generate the high frequency of 77 GHz or to convert it into signals that can be analyzed.

Control loops with high quality reference oscillators are frequently used to stabilize the signals. These reference oscillators convert the actual radar signal into a control frequency range suitable for a phase locked loop (PLL), and themselves normally operate at frequencies (e.g., 18 GHz) that may not be transmitted, or transmitted only at very low levels, due to relevant standards and regulations. For that reason the affected circuit elements are provided with shield casings.

On the other hand, however, the signal stabilizer must be linked to the transmission module in order to enable it to act on the latter's signals.

It is known to connect the shielded circuit elements via high-frequency lines installed on the circuit board, which requires corresponding openings in the shield casing. Casing channels are utilized, which function as hollow conductor filter structures to suppress radiation of the frequency components to be shielded through these openings.

SUMMARY OF THE INVENTION

An object of the present invention is to provide a radar sensor that permits effective shielding of the radiation of the signal stabilizer while requiring little space.

This object is achieved by embedding the connection line in the circuit board.

As a result, the connection line does not run along the surface of the circuit board at the location where it crosses the wall of the shield casing, but is "buried" there in the interior of the circuit board, so that no short-circuit with the shield takes place. The shield casing is thus interrupted only by the thickness of the insulating layer or layers of the circuit board and is otherwise completely sealed; no additional openings have to be made in the wall of the casing for the connection line. This achieves excellent shielding and simultaneously saves the space for the previously required hollow conductor filter structures. A very simple design of the casing is therefore obtained as well.

The connection line may be realized as a differential connection line and formed by an electrically conductive layer of the circuit board, which optionally forms the ground layer of the circuit board at the same time. The conductive connection between the connection line and the conductive structures extending along the surface of the circuit board is then able to be realized with the aid of plated contactings, for example, which are known as VIAs (vertical interconnect access).

In another embodiment, the connection is established with the aid of field coupling, e.g., slot coupling, instead of VIAs.

The connection line may optionally also be a micro strip line.

DETAILED DESCRIPTION

Figure 1:
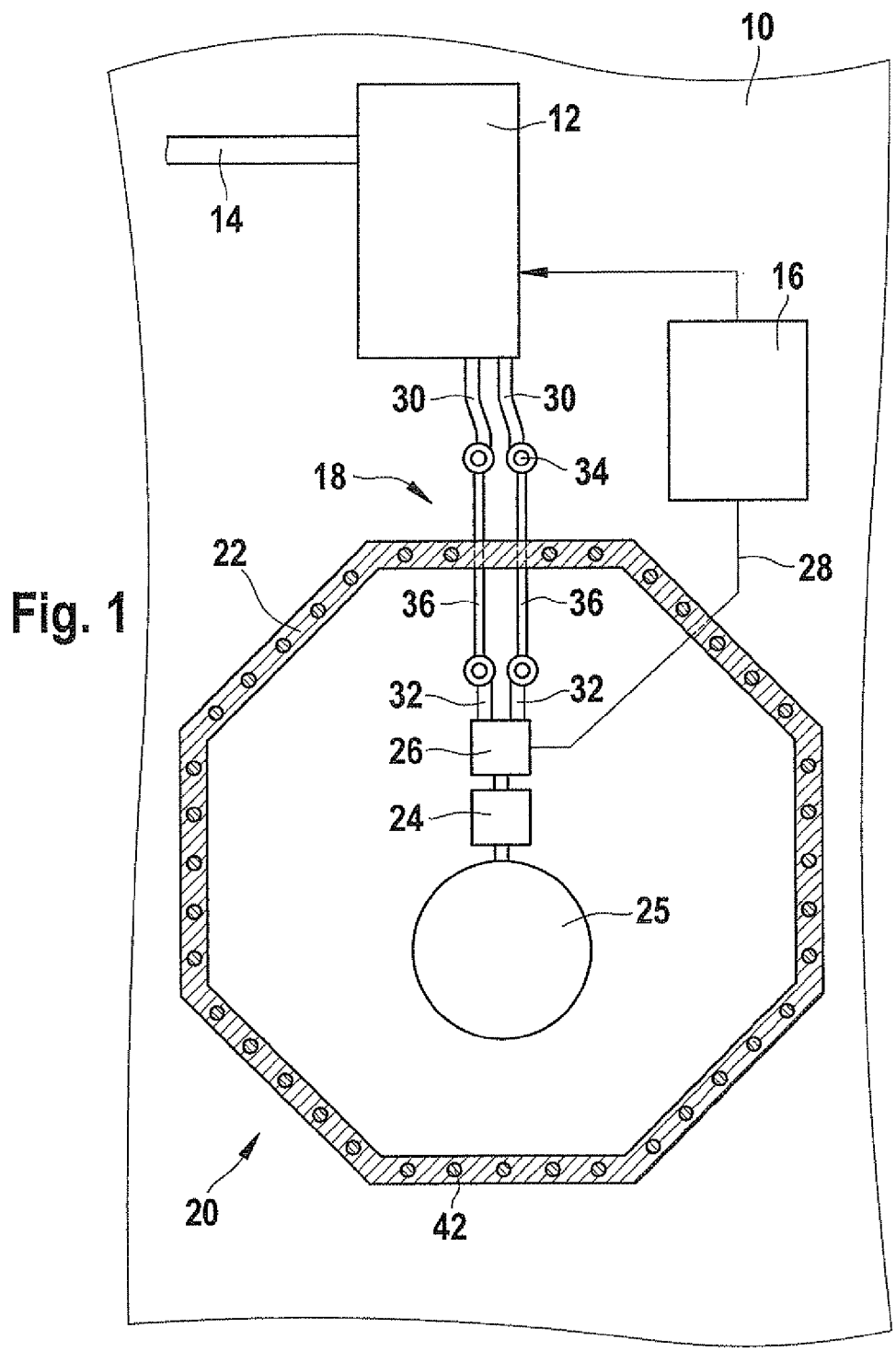
FIG. 1 shows a schematic outline of important components of a radar sensor according to the present invention.

FIG. 1 shows part of a circuit board 10 on which the important components of a radar sensor are located. A transmission module 12 of the radar sensor is formed by an MMIC. A high-frequency line 14 leads from transmission module 12 to an antenna (not shown), via which the radar signal is emitted and the reflected signal possibly also received again in the case of a monostatic antenna concept.

The signal output via high-frequency line 14 has a frequency of 77 GHz, for example. This frequency and also the phase of the output signal are stabilized with the aid of a phase locked loop (PLL) 16. However, since the PLL is unable to operate at the high frequency of 77 GHz, a high-frequency signal whose frequency has a certain fraction of the frequency of the transmitted signal, e.g., approximately 19 GHz, is generated within transmission module 12 by dividing the frequency of the transmitted signal. Via a connection line 18, this signal is output to a signal stabilizer 20, which is encapsulated in a shielding casing 22.

Signal stabilizer 20 includes an oscillator 24 having a resonator 25 of very high quality, which generates a reference signal with a frequency of 18 GHz, for example, and a mixer 26, which mixes the reference signal with the 19 GHz signal of transmission module 12 received via connection line 18. The mixing product, which has a considerably lower frequency, is forwarded via a line 28 to PLL 16, which detects possible frequency deviations of the transmission signal on high frequency line 14 with the aid of this signal, and which controls transmission module 12 in a closed-loop control circuit in such a way that the frequency deviation is removed.

According to the national regulations of various countries and according to some of the international standards (e.g., ETSI), the permissible emissions of high-frequency signals are restricted in the frequency range around 18 GHz, which means that only very low transmission outputs may be emitted in this frequency range.

The signal output by transmission module 12 via differential connection line 18 is able to be kept so weak that the permitted emissions are not exceeded in this case. However, the signal from oscillator 24 having resonator 25 must not differ too much from the 18 GHz signal of the transmission module and due to the required quality of the oscillator, must have a relatively high amplitude, which means that this oscillator constitutes a relatively strong emission source. For this reason oscillator 24, resonator 25, and mixer 26 connected to the oscillator are accommodated in the shielding, electrically conductive casing 22.

Differential connection line 18 in the illustrated example is formed both on the side of transmission module 12 and also on the side of mixer 26, by two parallel circuit traces 30 and 32, which run on the surface of circuit board 10. With the aid of a VIA 34, each of these circuit traces 30, 32 is connected to a circuit trace 36, which is embedded or "buried" in the insulating material of circuit board 10 and thus crosses underneath the wall of casing 22 within circuit board 10 and remains electrically insulated from this casing.

Figure 2:
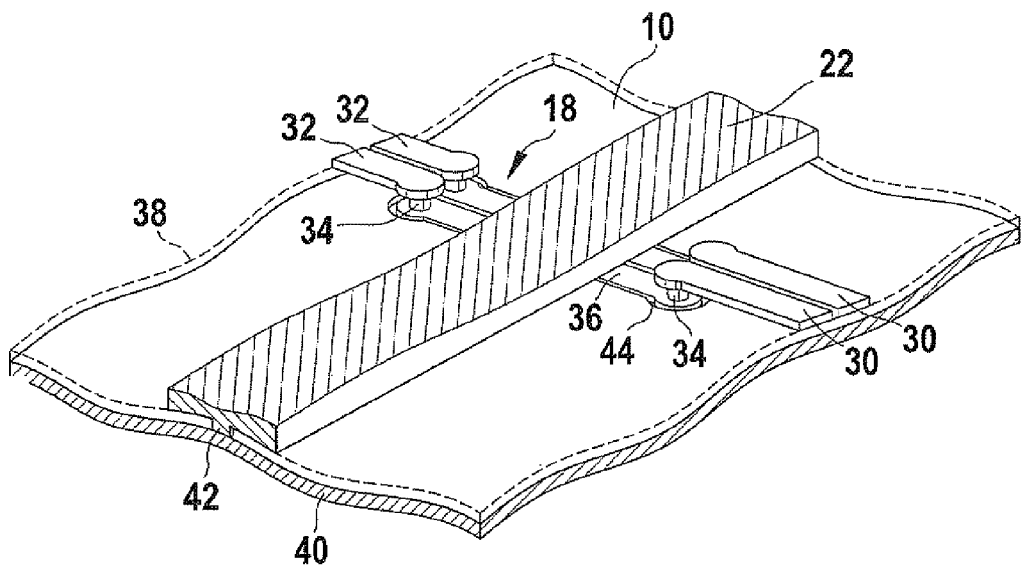
FIG. 2 shows a perspective view of a connection line in the radar sensor according to FIG. 1.

As illustrated by FIG. 2, circuit board 10 has a two-layer design in the example shown, including an insulating upper layer 38, which is shown as transparent layer in FIG. 2 for reasons of clarity, and a continuous, electrically conductive layer 40.

Layer 40 is used as ground of the radar sensor in this instance. The wall of casing 22, of which only a relatively flat lower edge region is shown in FIG. 2, sits directly on insulating layer 38, but is electrically connected to conductive layer 40 by tight-meshed through-hole platings 42, so that the portion of this layer 40 situated within casing 22, together with casing 2 forms a practically completely sealed shield for signal stabilizer 20.

Circuit traces 36, embedded in circuit board 10, of connection line 18 are formed by parts of conductive layer 40 that are separated from remaining parts of this layer, the ground layer, by a recess 44. Via these circuit traces 36, the weak 18 GHz signal of the transmission module is therefore able to be transmitted through the interior of circuit board 10 to mixer 26, without the need for any additional openings in the wall of casing 22, which then would have to be protected from leakage radiation by complex filter structures.

Figure 3:
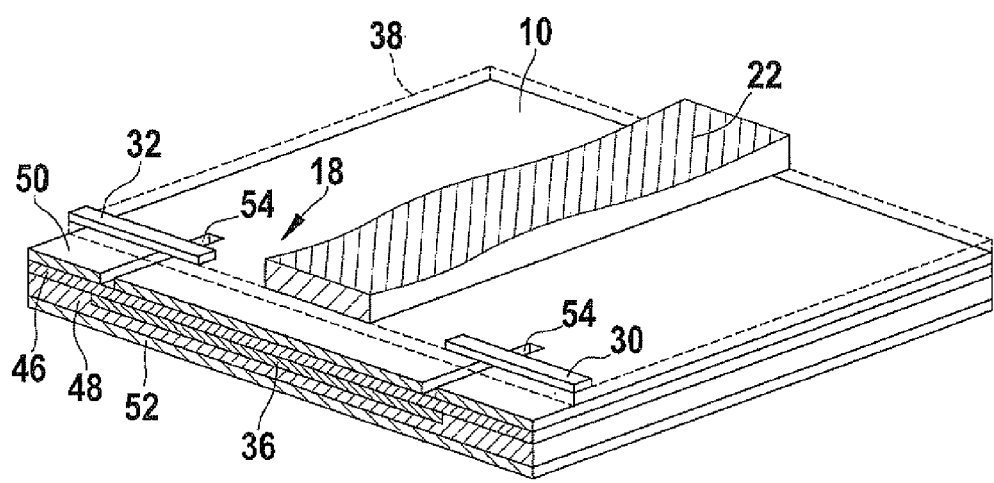
FIG. 3 shows a perspective view of a connection line according to another exemplary embodiment.

FIG. 3 shows a modified exemplary embodiment in which connection line 18 is formed by a single micro strip line (strip line). Circuit board 10 has a conductive ground layer 50 and two additional insulating layers 46 and 48 underneath upper insulating layer 38. A further electrically conductive ground layer 52 is situated on the rear side of the circuit board. Circuit trace 36, which crosses under the wall of casing 22, is situated between insulating layers 46 and 48 of the circuit board in this case and connected to circuit traces 30 and 32 not in galvanic manner but by field-coupling, e.g., by slots 54 in ground layer 50. In this case the electric field of the high frequency signal transmitted via connection line 18 forms between circuit traces 30, 32 and ground layer 50 or between circuit trace 36 and ground layers 50 and 52.

As an option, structures similar to those in FIG. 2 or 3 also may be used as lead-through for line 28 in FIG. 1.

What is claimed is:

1. A radar sensor comprising:
    a shared circuit board;
    a transmission module situated on the shared circuit board;
    a signal stabilizer situated on the shared circuit board;
    a casing, which accommodates the signal stabilizer, wherein the casing and a conductive layer of the circuit board located below the top surface of the circuit board together form a shield against high frequency radiation of the signal stabilizer, and wherein the casing directly contacts the conductive layer of the circuit board; and
    a connection line, which crosses through the shield, to connect the signal stabilizer to the transmission module, the connection line being embedded in the circuit board in an insulated fashion, wherein the connection line is formed by a selected part of the conductive layer separated from the rest of the conductive layer by a recess.

2. The radar sensor according to claim 1, wherein the connection line has at least one circuit trace embedded in the circuit board, the circuit trace being galvanically connected via vertical interconnect accesses to adjoining circuit traces extending on the circuit board.

* * * * *